United States Patent
Breu et al.

(10) Patent No.: US 12,434,875 B2
(45) Date of Patent: Oct. 7, 2025

(54) SYSTEM AND METHOD FOR AUTOMATICALLY ORIENTING PRODUCT CONTAINERS

(71) Applicant: Siemens Aktiengesellschaft, Munich (DE)

(72) Inventors: Annemarie Breu, Lawrenceville, NJ (US); Joseph Tylka, Pennington, NJ (US); Baris Erol, Rochester Hills, MI (US); Philip Gregor, Fort Lauderdale, FL (US); Dominic Trinko, La Crosse, WI (US)

(73) Assignee: Siemens Aktiengesellschaft, Munich (DE)

( * ) Notice: Subject to any disclaimer, the term of this patent is extended or adjusted under 35 U.S.C. 154(b) by 100 days.

(21) Appl. No.: 18/571,524

(22) PCT Filed: Feb. 8, 2022

(86) PCT No.: PCT/US2022/015574
§ 371 (c)(1),
(2) Date: Dec. 18, 2023

(87) PCT Pub. No.: WO2023/282938
PCT Pub. Date: Jan. 12, 2023

(65) Prior Publication Data
US 2024/0278952 A1    Aug. 22, 2024

Related U.S. Application Data

(60) Provisional application No. 63/219,965, filed on Jul. 9, 2021.

(51) Int. Cl.
*G06V 10/771* (2022.01)
*B65C 9/04* (2006.01)
(Continued)

(52) U.S. Cl.
CPC .................. *B65C 9/06* (2013.01); *B65C 9/04* (2013.01); *B65C 9/40* (2013.01); *B65G 43/08* (2013.01);
(Continued)

(58) Field of Classification Search
CPC ......... G06T 7/74; G06T 7/001; G06V 10/771; G06V 10/774; G06V 10/764;
(Continued)

(56) References Cited

U.S. PATENT DOCUMENTS

| | | |
|---|---|---|
| 2014/0339049 A1 | 11/2014 | Nitsch et al. |
| 2015/0094849 A1 | 4/2015 | Stork et al. |
| 2015/0210414 A1 | 7/2015 | Avril et al. |

OTHER PUBLICATIONS

WO2020235286 (Year: 2020).*
CN112166013 (Year: 2021).*
CN110603625 (Year: 2019).*

* cited by examiner

*Primary Examiner* — Gene O Crawford
*Assistant Examiner* — Lester Rushin, III

(57) ABSTRACT

A computer-implemented method for automatically orienting product containers includes acquiring a reference product label image associated with a batch of product containers on a production line and using a trained deep learning model to compute a perceptual center of the reference product label image based on perceptually relevant label features of the reference product label image. A production line camera acquires an image slice of the respective product label of individual product containers in the batch of product containers. A rotation angle for rotating an individual product container is computed based on the acquired image slice of the respective product label and a label center determined based on the computed perceptual center of the reference product label image. The computed rotation angle is com- (Continued)

municated to a controller to effect a rotation of the individual product container.

15 Claims, 7 Drawing Sheets

(51) Int. Cl.
*B65C 9/06* (2006.01)
*B65C 9/40* (2006.01)
*B65G 43/08* (2006.01)
*B65G 47/244* (2006.01)
*G06T 7/00* (2017.01)
*G06T 7/73* (2017.01)
*G06V 10/764* (2022.01)
*G06V 10/774* (2022.01)

(52) U.S. Cl.
CPC ............ *B65G 47/244* (2013.01); *G06T 7/001* (2013.01); *G06T 7/74* (2017.01); *G06V 10/764* (2022.01); *G06V 10/771* (2022.01); *G06V 10/774* (2022.01); *B65G 2201/0235* (2013.01); *B65G 2203/0225* (2013.01); *B65G 2203/041* (2013.01); *G06T 2207/20081* (2013.01); *G06T 2207/20084* (2013.01); *G06V 2201/09* (2022.01)

(58) Field of Classification Search
CPC .. G06V 2201/09; B65G 43/08; B65G 47/244; B65G 2201/0235; B65G 2203/0225; B65G 2203/041
USPC ........................................................ 198/394
See application file for complete search history.

SYSTEM AND METHOD FOR AUTOMATICALLY ORIENTING PRODUCT CONTAINERS

TECHNICAL FIELD

Embodiments of the present disclosure relate to systems and methods for orienting product containers in a desired manner, such as for packaging purposes. In particular, one or more embodiments of the present disclosure relate to a technique to automate orientation of product containers on a production line based on product label features and graphics.

BACKGROUND

In many industrial production processes, particularly in the food and beverage industry, products are shipped in containers, such as bottles, cans, etc. A product label is typically attached around an outer surface of the product container, which may contain graphics/features, such as a brand logo, a universal product code (UPC), nutrition facts, etc. The labeled containers may arrive at a packaging machine at random orientations or rotation angles in relation to the respective product labels. It is desirable to orient the labeled containers being conveyed to the packaging machine in a visually consistent and/or appealing way, so that the end consumer can best view or utilize the final packaging or shelf-ready product arrangement.

SUMMARY

Briefly, aspects of the present disclosure provide a technique to automatically orient product containers on a production line based on product label features with reduced operator intervention or configuration.

A first aspect of the disclosure provides a computer-implemented method for automatically orienting product containers on a production line, wherein each product container has a product label disposed around an outer surface of the product container. The method comprises acquiring a reference product label image associated with a batch of product containers on a production line. The method further comprises using a trained deep learning model to compute a perceptual center of the reference product label image based on perceptually relevant label features of the reference product label image. The method further comprises acquiring, via a production line camera, an image slice of the respective product label of individual product containers in the batch of product containers. The method further comprises computing a rotation angle for an individual product container based on the acquired image slice of the respective product label and a label center determined based on the computed perceptual center of the reference product label image. The method further comprises communicating the computed rotation angle to a controller to effect a rotation of the individual product container from an initial orientation to a final orientation based on the computed rotation angle.

Other aspects of the present disclosure implement features of the above-described method in computing systems and computer program products.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Figure 1:
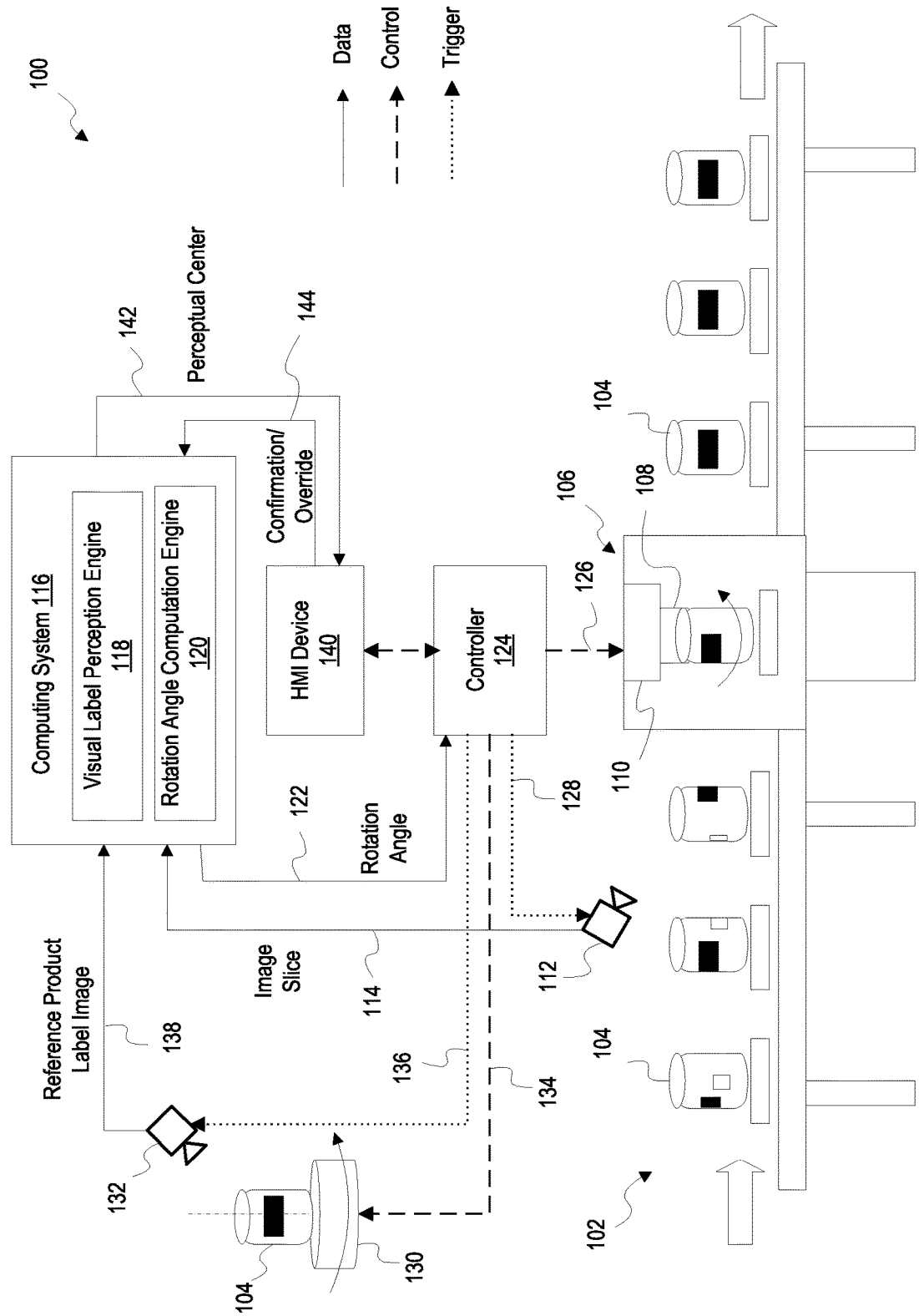
FIG. 1 is a schematic diagram illustrating a system for automatically orienting product containers on a production line according to an example embodiment.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

A variety of container orienting systems exist to orient cans, bottles, or other containers of various shapes in a common direction. For example, servo-based orienting systems can perform this task at high speeds using sensors (such as vision systems) to detect arbitrary actual container positions, and then correspondingly rotate the containers into the desired orientation.

To configure the orienting system for a new product or label, a production engineer usually specifies for the orienting system the baseline product label/graphics, as well as the desired orientation of the product container relative to that label. This manual engineering step may limit how quickly a production line can changeover from one product to another, or to introduce a new product label for the same product.

Embodiments of the present disclosure provide an artificial intelligence (AI) based solution that can, without any a priori knowledge of the product label but with high accuracy, identify which part of the product label should form the front portion of the product label which is to be displayed to the consumer. The AI-based solution is based on the recognition that product labels are usually designed by marketing experts and graphic designers, and therefore follow common design patterns and best practices for grabbing the consumer's attention. For example, certain label features such as large texts or product/brand logos may often be the parts of the product label that are meant to catch the consumer's eye, and are hence intended to be located on the front portion of the product label. Furthermore, certain label features such as bar codes/UPC, nutritional facts tables, etc., may be intended to be located away from the front portion of the product label, such as for scanning/pricing reasons. For example, in multi-pack product containers, it may be desirable that bar codes for individual containers face inwards, to prevent customers from scanning individual product barcodes instead of the bar code of the pack for pricing.

In at least some embodiments, the proposed AI-based solution can realize a fully automated system that can automatically determine a perceptual center of a reference product label and, when presented with a randomly oriented product container on a production line, compute a rotation angle to rotate the product container to a correct orientation, such as for packaging purposes, without operator configuration or intervention. In some embodiments, depending on a confidence level of the computed perceptual center of the product label, the AI-based solution may be assisted by a user confirmation or an override with user-specified front portion of the product label.

Disclosed embodiments can reduce the overall engineering effort for automation system integration and label configuration for new product containers arriving on the production line and can thus provide a faster change-over when switching from one product or product label to another on the production line. Furthermore, disclosed embodiments can perform label perception with high accuracies while providing comparable runtime performance for inference and alignment in relation to existing solutions.

Turning now to the drawings, FIG. 1 illustrates a system 100 for automatically orienting product containers 104 on a production line 102 according to an example embodiment. In particular, the disclosed system 100 may be used to automatically orient labeled product containers 104 based on label features and graphics on the product label.

Product containers 104 may have various shapes, typically (but not necessarily) having an axis-symmetric outer surface. For example, the most common types of product containers used in the food and beverage industry include cans, bottles, etc. A product label may be attached or otherwise disposed around the outer surface of each product container 104. The product label may extend fully (i.e., 360 degrees) around the outer surface of product container 104. As a schematic illustration, in FIG. 1, the black and white boxes on the product containers 104 depict various label features (e.g., brand logos, UPC codes, etc.) of the respective product label.

As illustrated in FIG. 1, incoming product containers 104 may have random orientations in relation to their product labels. The randomly oriented product containers 104 may be individually rotated by a respective specified rotation angle via an orienting unit 106, to ensure that the outgoing product containers 104 have a consistent orientation in relation to the product labels, as illustrated in the drawing. In one example configuration, the orienting unit 106 may comprise one or more grippers 108 (e.g., suction-based grippers) for holding individual product containers 104 and a servo-controlled motor 110 coupled to the respective gripper 108. The motor(s) 110 may be individually controlled based on respective control signal(s) 126 from a controller 124, for rotating the gripper-held product container 104 by the respective specified rotation angle. In examples, the outgoing (re-)oriented product containers 104 may be conveyed to a packaging machine, where a group of product containers 104 may be packed into a single packaging (e.g., a six-pack of beverage cans). Disclosed embodiments can enable an AI-based determination of the rotation angle for individual product containers such that an end consumer can best view or utilize the final packaging or shelf-ready product arrangement.

In accordance with an illustrated embodiment, the system 100 may comprise a production line camera 112 arranged to scan each product container 104 being conveyed on the production line 102 to acquire an image thereof. Because of the 3D shape of the product container 104, the production line camera 112 may capture only an image slice of the respective product label. The term "image slice", as used in this specification, refers to an image of a portion or segment of the product label acquired via a partial (e.g., 180-degree) scan by the production line camera 112. The production line camera 112 may suitably include a high-speed camera configured to capture image slices of respective product labels of individual product containers 104 in a batch of product containers on the production line 102. For example, in one embodiment as illustrated herein, the production line camera 112 and its lighting system for producing a flash may be triggered based on precisely timed trigger signals 128 from the controller 124, which may also control the position and speed of the product containers 104 (e.g., speed of conveyor system). The image slices acquired for individual product containers 104 may be communicated as data signals 114 to a computing system 116 to compute respective rotation angles for those individual product containers 104 at runtime.

The computing system 116 may comprise, for example, an industrial PC, an edge computing device, or any other computing system comprising one or more processors and a memory storing algorithmic modules executable by the one or more processors. The algorithmic modules include at least a visual label perception engine 118 and a rotation angle computation engine 120. The various engines described herein, including the visual label perception engine 118 and the rotation angle computation engine 120, including components thereof, may be implemented by the computing system 116 in various ways, for example, as hardware and programming. The programming for the engines 118, 120 may take the form of processor-executable instructions stored on non-transitory machine-readable storage mediums and the hardware for the engines may include processors to execute those instructions. The processing capability of the systems, devices, and engines described herein, including the visual label perception engine 118 and the rotation angle computation engine 120 may be distributed among multiple system components, such as among multiple processors and memories, optionally including multiple distributed processing systems or cloud/network elements. An example of a computing system suitable for the present application is described below referring to FIG. 7

Still referring to FIG. 1, the visual label perception engine 118 may be configured to acquire a reference product label image associated with the batch of product containers 104 on the production line 102 and use a trained deep learning model to compute a perceptual center of the reference product label image based on perceptually relevant label features of the reference product label image. The visual label perception engine 118 may be implemented as part of an offline system for initial calibration setup. The rotation angle computation engine 120 may be configured to compute, at runtime, a rotation angle for an individual product container 104 based on the image slice of the respective product label acquired via the production line camera 112 and a label center determined based on the computed perceptual center of the reference product label image. The computed perceptual center of the reference product label image may be determined as the label center for computing the rotation angle. In some embodiments, depending upon a confidence level associated the computed perceptual center, the label center used for computing the rotation angle may be the computed perceptual center or may be derived from a user-specified front portion of the label.

The computed rotation angle for each product container 104 may be communicated by the computing system 116 as a data signal 122 to the controller 124. In examples, the controller 124 may include a programmable logic controller (PLC) or any other type of industrial controller configured to convert the data signal 122 into a control signal 126 and communicate the control signal 126 to the appropriate servo-controlled motor 110 associated with the respective product container 104, to effect a rotation of the product container 104 from an initial orientation to a final orientation based on the computed rotation angle.

In one embodiment, as shown in FIG. 1, the reference product label image for initial calibration may be acquired via a 360-degree scan of a reference product container associated with the batch of product containers. Generally, but not necessarily, the product labels for all product containers in the same batch may be identical. The reference product container can be one of the product containers 104 belonging to a new batch of product containers arriving on the production line 102 or a different product container representative of that batch. The reference product container (e.g., product container 104) may be mounted on a rotary stage 130 such that a camera 132 may perform a 360-degree scan of the reference product label. A controller (e.g., controller 124) may communicate control signals 134 to control the rotation and speed of the rotary stage 130 and issue appropriately timed trigger signals 136 to trigger the camera 132 and its lighting system for producing a synchronized flash. The 360-degree scanned reference product label image may be communicated by the camera 132 as data signals 138 to the computing system 116 to determine a perceptual center of the reference product label image using the visual label perception engine 118. In an alternate embodiment, the reference product label image may be obtained directly from the product manufacturer.

Figure 2:
FIG. 2 is an illustrative example of a reference product label image.

FIG. 2 shows an illustrative example of a reference product label image 200. For illustration, the horizontal axis of the reference product label image 200 represents angular distance. As shown, the reference product label image 200 may comprise a two-dimensional flat or un-warped image representing a 360-degree layout of the reference product label.

As per disclosed embodiments, the visual label perception engine 118 (FIG. 1) may utilize at least one deep learning model that may include one or more pre-trained feature detection models/neural networks to detect perceptually relevant label features on the reference product label image 200. In an exemplary embodiment, the deep learning model may be trained on a training dataset comprising images of a plurality of different product labels via a supervised learning process using classification labels for known perceptually relevant label features of those images (of the dataset), such that the trained deep learning model being can detect and localize perceptually relevant label features on the reference product label image. In one suitable implementation, the training dataset may be obtained from an existing OpenLogo dataset that comprises product labels of a large number of known products.

For model training, the product labels in the training dataset may be provided with bounding box annotations for different classes of perceptually relevant label features, that can define the classification labels for the deep learning model. The different classes of perceptually relevant label features may include, without limitation, large texts, brand logos, bar codes (e.g., UPC codes), geometric shapes, bold colors or high color-contrast features, nutritional facts tables, etc. The visual label perception engine 118 may use the trained deep learning model to detect and localize perceptually relevant label features on the reference product label image, for example, by way of bounding boxes. An example output obtained from the trained deep learning model may be visualized as shown in FIG. 3, where detected perceptually relevant label features, namely large text, geometric shape, nutritional facts table and UPC code are localized by way of bounding boxes 302, 304, 306, 308 respectively on the reference product label image 200.

According to disclosed embodiments, the perceptually relevant label features or feature classes may be grouped as "interesting" and "non-interesting". The "interesting" label features may include those label features that define a portion of a product label meant to form a front face of the product label. Examples of "interesting" label features include, without limitation, large texts, large geometric shapes, high color-contrast features, brand logos, etc. The "non-interesting" label features may include those label features that define a portion of the product label meant to be located away from the front face. Examples of "non-interesting" label features include, without limitation, bar codes (e.g., UPC codes), tables (e.g., nutritional fact tables), etc.

By identifying the locations of both, the "interesting" and the "non-interesting" label features, the visual label perception engine 118 may algorithmically compute a perceptual center of the reference product label image. In one embodiment, the visual label perception engine 118 may compute the perceptual center of the reference product label image based on a weighted combination of the locations of perceptually relevant label features detected on the reference product label image. Herein, for example, each detected perceptually relevant label feature may be assigned a respective weight that may depend on variables such as the size (e.g., angular extent) of the detected label feature, whether the detected label feature is an "interesting" or "non-interesting" label feature, among other variables. In embodiments, to ensure that the computed perceptual center of the reference product label is located further away from the "non-interesting" label features, the "non-interesting" label features may be assigned negative weights, or generally lower weights in relation to the "interesting" label features.

Figure 3:
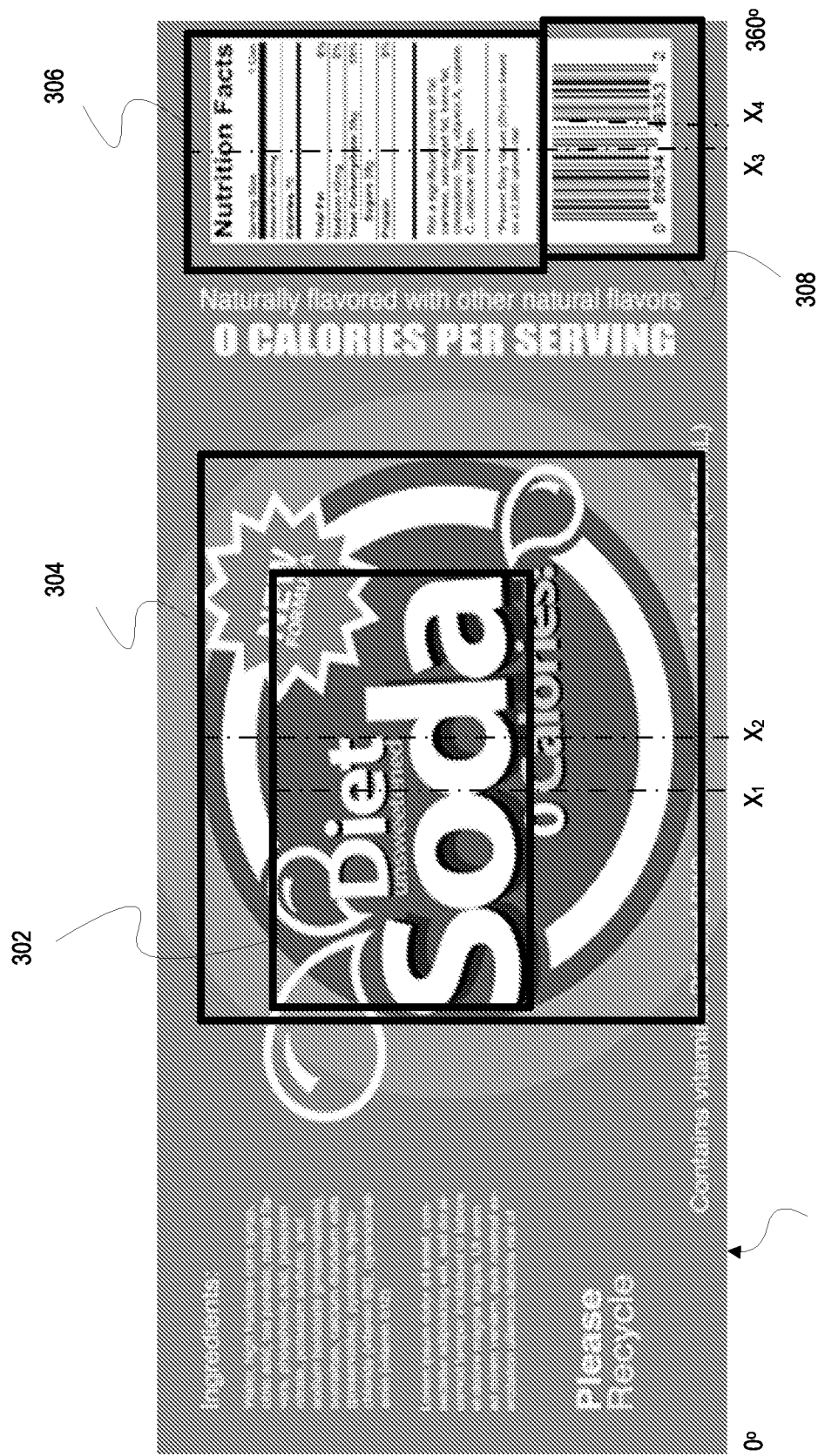
FIG. 3 is an illustrative visualization of perceptually relevant label features localized on the reference product label image.

To illustrate one example methodology, in the example shown in FIG. 3, the location of each detected perceptually relevant label feature may be defined by a center of the respective bounding box 302, 304, 306, 308 along the horizontal or angle axis. These locations are represented as $X_1$, $X_2$, $X_3$, and $X_4$ respectively in FIG. 3. The respective weight assigned to each of the detected perceptually relevant label features may be determined as a function of the width (i.e., angular extent) of the respective bounding box 302, 304, 306, 308 along the horizontal or angle axis. Furthermore, the weights associated with the "interesting" label features (e.g., corresponding to bounding boxes 302, 304) may comprise positive values, while the weights associated with the "non-interesting" label features (e.g., corresponding to bounding boxes 306, 308) may comprise negative values. The location of the perceptual center may be determined as a weighted average of the locations $X_1$, $X_2$, $X_3$, and $X_4$ of each of the detected perceptually relevant label features. In some embodiments, the computed perceptual center may be localized by a bounding box with a defined width around the computed location of the perceptual center.

Figure 4:
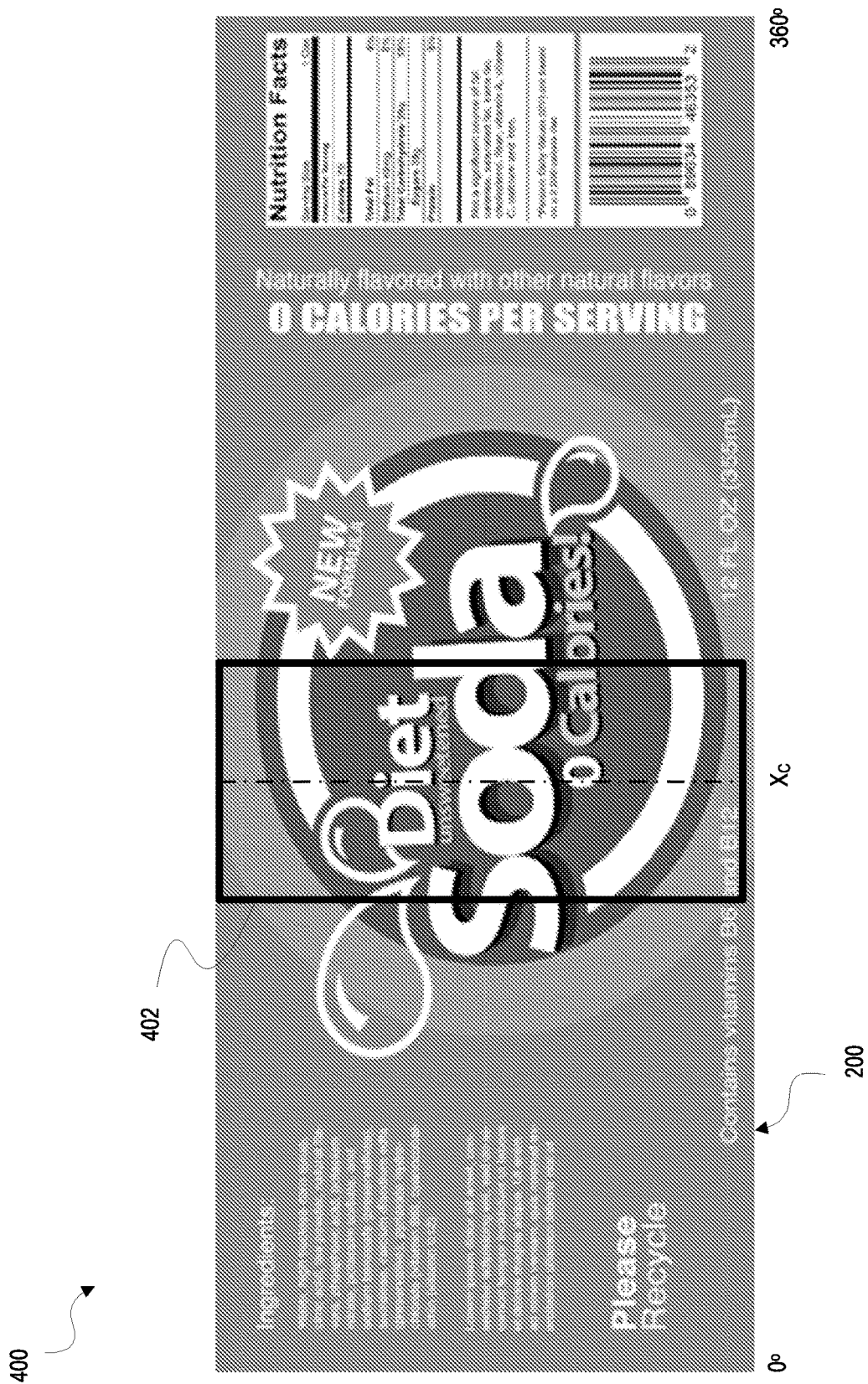
FIG. 4 is an example representation of a perceptual center of the reference product label image.

An example representation of a computed perceptual center of the reference product label is depicted in FIG. 4. Herein, the perceptual center of the reference product label image 200 is localized by a bounding box 402 having a defined width around a location $X_C$. The location $X_C$ may be determined based on the weighted combination of the locations $X_1$, $X_2$, $X_3$, and $X_4$, for example, as described above. As shown, the lower or negative weights assigned to the "non-interesting" label features (corresponding to bounding boxes 306, 308) can result in the computed perceptual center being located further away from those "non-interesting" label features.

In an alternate embodiment, the visual label perception engine 118 may compute the perceptual center of the reference product label image using a deep learning model (e.g., one or more neural networks) trained on a dataset comprising images of a large number of product labels where the images of the dataset may each be annotated with a known label center. For example, the model may utilize the initial layers of a neural network to extract label features (which may include perceptually relevant label features as described herein) and subsequent layers to learn a spatial relationship between the extracted label features and the annotated label center.

The visual label perception engine 118 may thus identity the location of the perceptual center of a new product label without any a priori knowledge of the product label, or even the product or brand. Consequently, the disclosed embodiments provide a completely general approach that requires no user input to set up the system, where the AI-based visual label perception engine 118 can, from a single image of the reference product label, decide by itself what is the "important" part of the image for the customer to see.

Continuing with reference to FIG. 1, in some embodiments, the computing system 116 may communicate data signals 142 indicative of the computed perceptual center of the reference product label image to a human machine interface (HMI) device 140. The HMI device 140 may be configured to visualize and display a label front face to an operator based on the computed perceptual center of the reference product label, thereby providing transparency into the underlying orientation process. The HMI device 140 may also be used to assist the AI-based computation of the perceptual center, especially, in case of a low confidence level associated with the computed perceptual center. The confidence level associated with the computed perceptual center may be determined, for example, based on the confidence scores associated with the detected perceptually relevant label features inferred by the deep learning model.

In one embodiment, if the determined confidence level associated with the computed perceptual center is below a predefined threshold, a user input may be sought via the HMI device 140 to confirm or to override the displayed label front face center with a user specified label front face. The user confirmation or override may be communicated by the HMI device 140 as data signals 144 to the computing system 116. Based on the user input communicated via the data signals 144, the label center used for computing the rotation angle by the rotation angle computation engine 120 may be either one of: the perceptual center computed by the visual label perception engine 118 or a computed center of the user specified label front face. In at least some embodiments, if the determined confidence level associated with the computed perceptual center is higher than a predefined threshold, the computed perceptual center may be used to automatically determine the rotation angle for individual product containers without any operator intervention.

At runtime, the rotation angle computation engine 120 may execute an inline inference cycle, which may involve acquiring an image slice of the product label for each product container 104 on the production line 102 communicated by the production line camera 112 (via data signals 114) and computing a required offset rotation angle for the product container 104 based on the acquired image slice and determined label center of the reference product label image. The computed rotation angle may be used to effect a rotation of the product container 104 via the controller 124 to achieve a desired/consistent orientation in relation to the respective product label, for example, as described above. Example embodiments to realize the rotation angle computation engine 120 are described below.

In a first embodiment, the rotation angle computation engine 120 may use a trained rotation angle classifier to infer an offset rotation angle from the acquired image slice. The rotation angle classifier may include a neural network, and suitably, a shallow convolutional neural network capable of executing fast inference cycles for high-speed production lines. The rotation angle classifier may be trained using a dataset produced by performing augmentation of image patches corresponding to different regions of the reference product label image having different angular offsets from the label center. The angular offsets may be used to define classification labels for the image patches. A suitably trained rotation angle classifier can provide a high degree of accuracy in computation of the required rotation angle for each product container.

Figure 5:
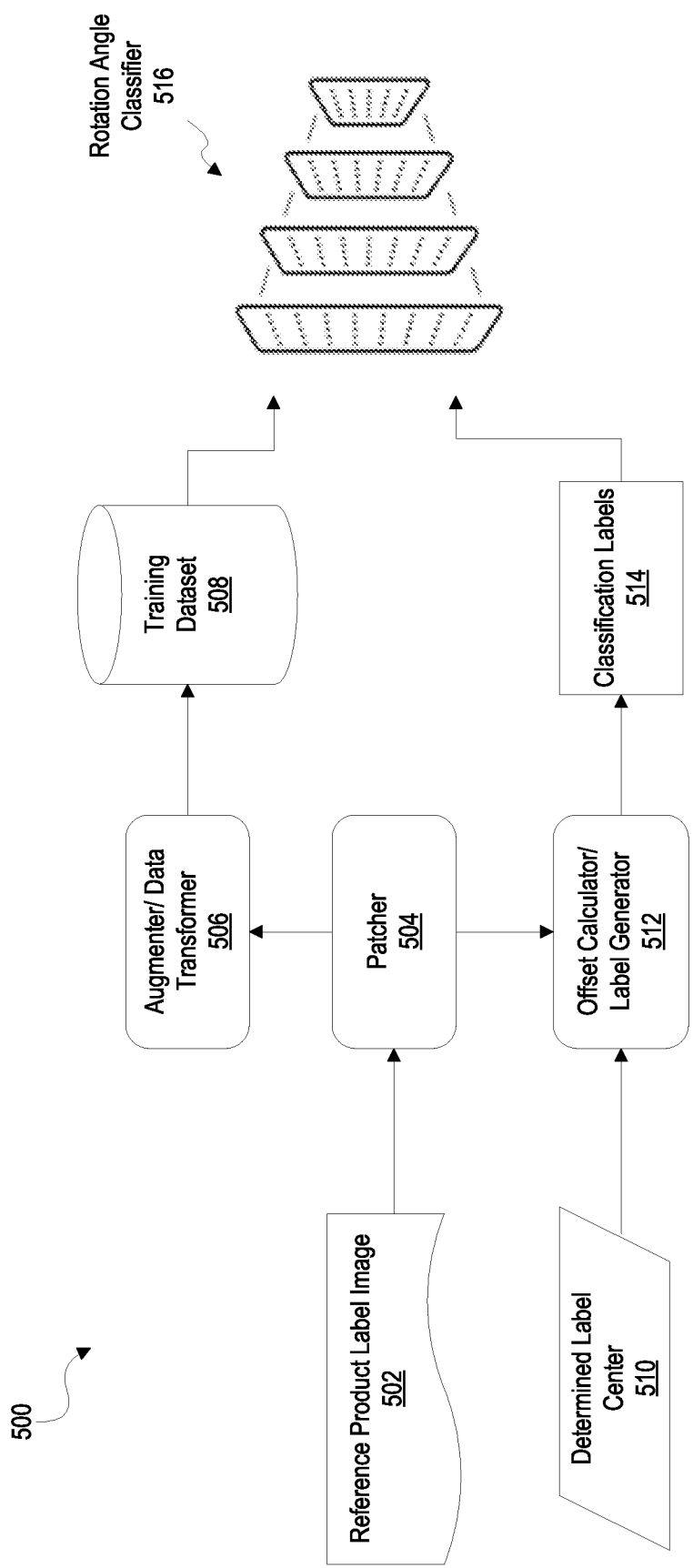
FIG. 5 is a schematic process flow diagram illustrating an example technique for training a rotation angle classifier to be deployed for computation of rotation angle at runtime.

FIG. 5 illustrates an example process flow 500 suitable for training a rotation angle classifier, such as that described above. The various modules described herein, including the patcher 504, the augmenter/data transformer 506 and the offset calculator/label generator 512, including components thereof, may be implemented by a computing system, such as the computing system 116, in various ways, for example, as hardware and programming.

The patcher 504 may be used to generate image patches from a reference product label image 502. Each image patch may define a region of the reference product label image 502, for example, corresponding to a 180-degree field of view. In an example embodiment, the image patches may be generated by cropping out 360/(x−1) patches from the reference product label image 502, going from 0° to (360°−x°) in steps of x°.

The augmenter/data transformer 506 may add noise and warp to the image patches to simulate how a product label would look when wrapped around an axis-symmetric (e.g., cylindrical) product container. Additionally, the augmenter/data transformer 506 may match extrinsic and intrinsic camera properties (e.g., lighting, resolution, etc.) and simulate camera distortions on the image patches to simulate actual image slices captured by the production line camera 112. The augmenter/data transformer 506 may add and combine such modifications to generate a sufficiently large and realistic training dataset 508.

The offset calculator/label generator 512 may determine, for each image patch, an angular offset in relation to the determined label center 510 of the reference product label image 502. The determined label center 510 may be the computed perceptual center of the reference product image 502. Alternately, if the confidence level associated with the computed perceptual center is low (e.g., below a predefined threshold), the label center 510 may be determined from a user input, for example, as described above. The angular offset may be determined, for example, by locating a center of each image patch and computing an angular distance from the center of the image patch to the determined label center of the reference product label image 502. The angular offsets, thus determined, may be used to define classification labels 514.

The training data set 508 and the corresponding labels 514 may be used to train a rotation angle classifier 516 via a supervised learning process. Once trained and validated, the rotation angle classifier 516 may be deployed to the runtime system to automatically infer an offset rotation angle from an image slice acquired via the production line camera 112.

In a second embodiment, the rotation angle computation engine 120 may utilize a template matching algorithm. Template matching is a technique in computer vision for searching and finding the location of a template image in a larger parent image. In the context of the present application, a template matching algorithm can provide high runtime speed for computation of the required rotation angle for each product container. A suitable example implementation may involve using a template matching functionality provided by the OpenCV library.

Figure 6:
FIG. 6 is an example representation of the use of a template matching algorithm at runtime to infer a location of a patch on the reference product label image that matches a captured image slice of a product label.

FIG. 6 is an example representation of the use of a template matching algorithm at runtime to infer a location of a patch on the reference product label image that matches a captured image slice of a product label. In the shown example, the image slice 602 represents a warped image with a 180-degree field of view of a portion of a product label wrapped around a cylindrical product container acquired via the production line camera 112 (via data signals 114). The template matching algorithm may be executed using the image slice 602 as a template image and the reference product label image 200 as a parent image. When executed, the template matching algorithm may slide the template image 602 over the parent image 200 (e.g., as in 2D convolution) and compare the template image 602 to patches (e.g., 180-degree patches in this example) of the parent image 200 to locate a matching patch 604 on the parent image 200. In one implementation using OpenCV, depending on the template matching criteria used, the matching patch 604 may be determined as a global minimum (when TM_SQDIFF is used) or global maximum (when TM_CCORR or TM_CCOEFF is used) using the minMaxLoc function in OpenCV.

The rotation angle may be determined by computing an angular offset between the matching patch 604 and the determined label center. The angular offset may be determined, for example, by locating a center $X_M$ of the matching patch 604 and computing an angular distance from the center of the matching patch 604 to the determined label center of the reference product label image 200. In the shown example, the determined label center is the computed perceptual center $X_C$ of the reference product label image 200. Alternately, if the confidence level associated with the computed perceptual center $X_C$ is low (e.g., below a pre-defined threshold), the label center may be determined from a user input, for example, as described above.

Figure 7:
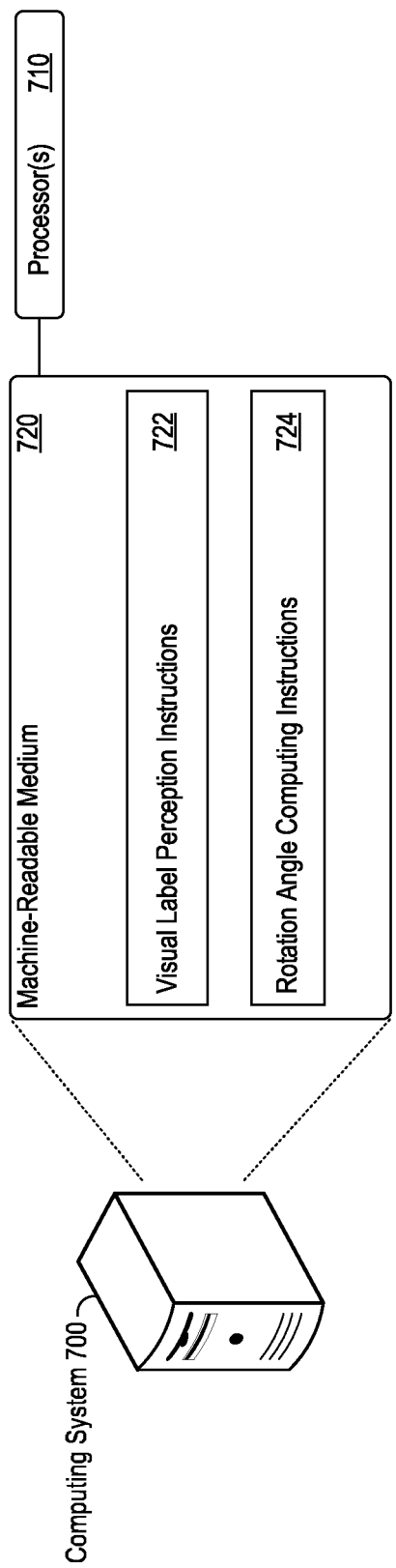
FIG. 7 illustrates a computing system that can support automatic orientation of product containers in a production line according to disclosed embodiments.

FIG. 7 shows an example of a computing system 700 that can support automatic orientation of product containers in a production line according to disclosed embodiments. In examples, the computing system 700 may comprise one or more of an industrial PC, an edge computing device, among others. The computing system 700 includes at least one processor 710, which may take the form of a single or multiple processors. The processor(s) 710 may include a central processing unit (CPU), a graphics processing unit (GPU), a neural processing unit (NPU), a microprocessor, or any hardware device suitable for executing instructions stored on a memory comprising a machine-readable medium 720. The machine-readable medium 720 may take the form of any non-transitory electronic, magnetic, optical, or other physical storage device that stores executable instructions, such as visual label perception instructions 722 and rotation angle computation instructions 724, as shown in FIG. 7. As such, the machine-readable medium 720 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 700 may execute instructions stored on the machine-readable medium 720 through the processor(s) 710. Executing the instructions (e.g., the visual label perception instructions 722 and the rotation angle computation instructions 724) may cause the computing system 700 to perform any of the technical features described herein, including according to any of the features of the visual label perception engine 118 and the rotation angle computation engine 120, as described above.

The systems, methods, devices, and logic described above, including the visual label perception engine 118 and the rotation angle computation engine 120, may be implemented in many different ways in many different combinations of hardware, logic, circuitry, and executable instructions stored on a machine-readable medium. For example, these engines may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the visual label perception engine 118 and the rotation angle computation engine 120. Computer readable program instructions described herein can be downloaded to respective computing/processing devices from a computer readable storage medium or to an external computer or external storage device via a network, for example, the Internet, a local area network, a wide area network and/or a wireless network.

The processing capability of the systems, devices, and engines described herein, including the visual label perception engine 118 and the rotation angle computation engine 120 may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

The system and processes of the figures are not exclusive. Other systems, processes and menus may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the disclosure.

What is claimed is:

1. A computer-implemented method for automatically orienting product containers on a production line, wherein each product container has a product label disposed around an outer surface of the product container, the method comprising:
    acquiring a reference product label image associated with a batch of product containers on the production line,
    using a trained deep learning model to compute a perceptual center of the reference product label image based on perceptually relevant label features of the reference product label image,
    acquiring, via a production line camera, an image slice of the respective product label of individual product containers in the batch of product containers,
    computing a rotation angle for an individual product container based on the acquired image slice of the respective product label and a label center determined based on the computed perceptual center of the reference product label image, and
    communicating the computed rotation angle to a controller to effect a rotation of the individual product container from an initial orientation to a final orientation based on the computed rotation angle.

2. The method according to claim 1, wherein the reference product label image is acquired via a 360-degree scan of a reference product container associated with the batch of product containers.

3. The method according to claim 1, wherein the deep learning model is trained on a dataset comprising images of a plurality of different product labels via a supervised learning process using classification labels for known perceptually relevant label features of those images, the trained deep learning model being configured to detect and localize perceptually relevant label features on the reference product label image.

4. The method according to claim 2, wherein the perceptually relevant label features comprise "interesting" label features that define a portion of a product label forming a front face of the product label and "non-interesting" label features that define a portion of the product label located away from the front face.

5. The method according to claim 4,
    wherein the "interesting" label features comprise one or more features selected from the group consisting of: large texts, large geometric shapes, and high color-contrast features, and
    wherein the "non-interesting" label features comprise one or more features selected from the group consisting of: bar codes and tables.

6. The method according to claim 2, wherein the perceptual center of the reference product label image is computed based on a weighted combination of respective locations of perceptually relevant label features detected on the reference product label image.

7. The method according to claim 6, wherein each detected perceptually relevant label feature is assigned a weight depending on whether the detected perceptually relevant label feature is an "interesting" label feature or a "non-interesting" label feature, and
    wherein the assigned weights are configured to locate the computed perceptual center away from detected perceptually relevant label features that are "non-interesting" label features.

8. The method according to claim 1, wherein the computed perceptual center is determined as the label center for computing the rotation angle.

9. The method according to claim 1, further comprising:
    displaying, via a human machine interface (HMI) device, a label front face based on the computed perceptual center of the reference product label,
    if a determined confidence level associated with the computer perceptual center is below a predefined threshold, then seeking a user input to confirm or to override the displayed label front face center with a user specified label front face via the HMI device,
    wherein, based on the user input, the label center used for computing the rotation angle is determined to be the computed perceptual center based on the deep learning model or a computed center of the user specified label front face.

10. The method according to claim 1, wherein the rotation angle is computed by feeding the acquired image slice to a trained rotation angle classifier to produce an inference output indicative of the rotation angle,
    wherein the rotation angle classifier is trained using a dataset produced by performing augmentation of image patches corresponding to different regions of the reference product label image having different angular offsets from the label center, the angular offsets being used as classification labels for the image patches.

11. The method according to claim 1, wherein the rotation angle is computed by:
    executing a template matching algorithm using the acquired image slice as a template to locate a matching patch in the reference product label image, and
    computing an angular offset between the matching patch and the label center.

12. A non-transitory computer-readable storage medium including instructions that, when processed by a computer, configure the computer to perform the method according to claim 1.

13. A computing system comprising:
    at least one processor; and
    a memory storing instructions that, when executed by the at least one processor, configure the computing system to carry out a method according to claim 1.

14. A system for automatically orienting product containers on a production line, wherein each product container has a product label disposed around an outer surface of the product container, the system comprising:

a production line camera configured to capture image slices of respective product labels of individual product containers in a batch of product containers on the production line, a computing system comprising:
one or more processors, and
a memory storing algorithmic modules executable by the one or more processors, the algorithmic modules comprising:
a visual label perception engine configured to use a trained deep learning model to compute a perceptual center of the reference product label image based on perceptually relevant label features of the reference product label image, and
a rotation angle computation engine configured to compute a rotation angle for an individual product container based on the image slice of the respective product label acquired via the production line camera and a label center determined based on the computed perceptual center of the reference product label image, and a controller to effect a rotation of the individual product container from an initial orientation to a final orientation based on the computed rotation angle.

15. The system according to claim 14, further comprising a human machine interface (HMI) device configured to:

display a label front face based on the computed perceptual center of the reference product label, and seek a user input to confirm or to override the displayed label front face center with a user specified label front face if a determined confidence level associated with the computer perceptual center is below a predefined threshold, wherein, based on the user input, the label center used by the rotation angle computation engine to compute the rotation angle is determined to be the computed perceptual center based on the deep learning model or a computed center of the user specified label front face.

* * * * *